United States Patent
De Silva et al.

(10) Patent No.: US 12,466,028 B2
(45) Date of Patent: Nov. 11, 2025

(54) DAMAGE TOLERANT CAVITATION NOZZLE

(71) Applicants: The Boeing Company, Chicago, IL (US); Tohoku University, Sendai (JP)

(72) Inventors: Kandaudage Channa Ruwan De Silva, Madison, AL (US); Daniel Gordon Sanders, Cle Elum, WA (US); John K. Shimabukuro, Newcastle, WA (US); Hitoshi Soyama, Sendai (JP)

(73) Assignees: The Boeing Company, Arlington, VA (US); Tohoku University, Sendai (JP)

( * ) Notice: Subject to any disclaimer, the term of this patent is extended or adjusted under 35 U.S.C. 154(b) by 431 days.

(21) Appl. No.: 17/856,934

(22) Filed: Jul. 1, 2022

(65) Prior Publication Data

US 2024/0001509 A1    Jan. 4, 2024

(51) Int. Cl.
*B24C 5/04*    (2006.01)

(52) U.S. Cl.
CPC .................................... *B24C 5/04* (2013.01)

(58) Field of Classification Search
CPC .. B24C 5/04; B24C 1/10; B24C 11/00; B05B 1/34; B05B 1/042; B05B 5/00
See application file for complete search history.

(56) References Cited

U.S. PATENT DOCUMENTS

| | | | |
|---|---|---|---|
| 2,376,881 A | 5/1945 | Nielsen | |
| 3,807,632 A | 4/1974 | Johnson, Jr. | |
| 4,342,425 A * | 8/1982 | Vickers | E02F 3/9206 134/34 |
| 4,346,849 A * | 8/1982 | Rood | B05B 1/042 239/597 |
| 4,365,758 A * | 12/1982 | Schaming | B05B 1/042 239/600 |
| 4,474,251 A | 10/1984 | Johnson, Jr. | |
| 5,065,551 A | 11/1991 | Fraser | |
| 5,316,591 A | 5/1994 | Chao et al. | |
| 5,778,713 A | 7/1998 | Butler et al. | |
| 6,280,302 B1 | 8/2001 | Hashish et al. | |
| 6,341,151 B1 | 1/2002 | Enomoto et al. | |
| 6,425,276 B1 | 7/2002 | Hirano et al. | |

(Continued)

FOREIGN PATENT DOCUMENTS

| | | |
|---|---|---|
| CN | 101670556 A | 3/2010 |
| CN | 102430987 A | 5/2012 |

(Continued)

OTHER PUBLICATIONS

Chahine, Georges L., et al., "Cleaning and Cutting with Self-Resonating Pulsed Water Jets", 2nd US Water Jet Conference, 1983, pp. 195-207.

(Continued)

*Primary Examiner* — C. A. Rivera
(74) *Attorney, Agent, or Firm* — Walters & Wasylyna LLC (57) ABSTRACT

A cavitation nozzle is disclosed, including a plate, a hollow body, and a cap removably engaged with the hollow body and holding the plate against a distal end of the hollow body. The plate may have a central aperture and a distal surface, wherein the distal surface is bisected by a groove and the hollow body is configured to deliver high pressure fluid through the central aperture. The delivered high pressure fluid may be discharged as a cavitating jet.

20 Claims, 5 Drawing Sheets

(56) References Cited

U.S. PATENT DOCUMENTS

| | | |
|---|---|---|
| 6,855,208 B1 | 2/2005 | Soyama |
| 6,993,948 B2 | 2/2006 | Offer |
| 7,494,073 B2 | 2/2009 | Pivovarov |
| 8,833,444 B2 | 9/2014 | McAfee et al. |
| 9,050,642 B2 | 6/2015 | Alberts et al. |
| 9,200,341 B1 | 12/2015 | Sanders et al. |
| 9,399,151 B1 | 7/2016 | Combs et al. |
| 9,433,986 B2 | 9/2016 | Ogawa et al. |
| 9,573,246 B2 | 2/2017 | Maeguchi et al. |
| 9,739,695 B2 | 8/2017 | Michishita et al. |
| 10,233,511 B1 | 3/2019 | Sanders et al. |
| 10,265,833 B2 | 4/2019 | Sanders et al. |
| 10,836,012 B2 | 11/2020 | Sanders |
| 2002/0098776 A1 | 7/2002 | Dopper |
| 2003/0189114 A1* | 10/2003 | Taylor ............... C04B 35/63 239/602 |
| 2004/0235389 A1 | 11/2004 | Hashish et al. |
| 2005/0017090 A1 | 1/2005 | Pivovarov |
| 2005/0139697 A1 | 6/2005 | Pivovarov |
| 2006/0151634 A1 | 7/2006 | Pivovarov |
| 2007/0290063 A1 | 12/2007 | Combs |
| 2008/0223099 A1 | 9/2008 | David |
| 2010/0255759 A1* | 10/2010 | Ohashi ............... B24C 3/325 451/38 |
| 2012/0118562 A1 | 5/2012 | McAfee et al. |
| 2012/0219699 A1 | 8/2012 | Pettersson et al. |
| 2013/0284440 A1 | 10/2013 | McAfee et al. |
| 2013/0298626 A1* | 11/2013 | Karube ............... B08B 3/02 72/39 |
| 2014/0103147 A1* | 4/2014 | Dodson ............... B05B 1/02 239/597 |
| 2015/0151405 A1 | 6/2015 | Maeguchi et al. |
| 2019/0061103 A1 | 2/2019 | Sanders |
| 2019/0061104 A1 | 2/2019 | Sanders et al. |
| 2019/0308292 A1 | 10/2019 | Nagalingam et al. |
| 2020/0189068 A1 | 6/2020 | Sanders |
| 2021/0387309 A1 | 12/2021 | Sanders et al. |

FOREIGN PATENT DOCUMENTS

| | | | |
|---|---|---|---|
| CN | 102649994 A | 8/2012 | |
| CN | 103415358 A | 11/2013 | |
| CN | 104440584 A | 3/2015 | |
| CN | 205438241 U | 8/2016 | |
| CN | 106392863 A | 2/2017 | |
| DE | 60031257 T2 | 2/2007 | |
| DE | 102006037069 A1 | 2/2007 | |
| DE | 60030341 T2 | 8/2007 | |
| EP | 0450222 A2 | 10/1991 | |
| EP | 1500712 B1 | 8/2006 | |
| EP | 1170387 B1 | 10/2006 | |
| EP | 2546026 A1 | 1/2013 | |
| EP | 2736678 B1 | 9/2015 | |
| GB | 2410711 A * | 8/2005 | ............... B05B 1/00 |
| JP | H02237661 * | 9/1990 | |
| JP | H044831 * | 2/1992 | |
| JP | H04362124 A | 12/1992 | |
| JP | 406047672 A | 2/1994 | |
| JP | H0647667 A | 2/1994 | |
| JP | H07328855 A | 12/1995 | |
| JP | H07328857 A | 12/1995 | |
| JP | H07328859 A | 12/1995 | |
| JP | H07328860 A | 12/1995 | |
| JP | H0871919 A | 3/1996 | |
| JP | H0890418 A | 4/1996 | |
| JP | 2663163 B2 * | 10/1997 | |
| JP | 2003062492 A | 3/2003 | |
| JP | 3127847 U | 12/2006 | |
| JP | 2007075958 A | 3/2007 | |
| JP | 2007-260550 A | 10/2007 | |
| JP | 4240972 B2 | 3/2009 | |
| JP | 2009090443 A | 4/2009 | |
| JP | 4504641 B2 * | 7/2010 | |
| JP | 2011-245582 A | 12/2011 | |
| JP | 2012230253 A | 11/2012 | |
| JP | 2013082030 A | 5/2013 | |
| JP | 5405865 B2 * | 2/2014 | |
| JP | 5578318 A | 8/2014 | |
| JP | 5876701 B2 | 3/2016 | |
| JP | 2016221650 A | 12/2016 | |
| RU | 2592338 C2 | 6/2015 | |
| SU | 384652 A1 | 5/1973 | |
| WO | WO-2009154567 A1 * | 12/2009 | ............... B24C 5/04 |
| WO | 2012157619 A1 | 11/2012 | |
| WO | 2013019317 A1 | 2/2013 | |
| WO | 2016131483 A1 | 8/2016 | |

OTHER PUBLICATIONS

Vijay, M., et al., "A study of the practicality of cavitating water jets", Jet Cutting Technology, 1992, vol. 13, pp. 75-99.

Soyama, et al., Use of Cavitating Jet for Introducing Compressive Residual Stress, Article in Journal of Manufacturing Science and Engineering, vol. 22, Feb. 2000, 7 pages.

Macian, V., et al., "A CFD analysis of the influence of diesel nozzle geometry on the inception of cavitation", Atomization and Sprays, 2003, vol. 13, pp. 579-604.

Payri, Raul, et al. "A study of the relation between nozzle geometry, internal flow and sprays characteristics in diesel fuel injection systems", KSME International Journal, 2004, vol. 18, No. 7, pp. 1222-1235.

Desantes, J., et al., "Experimental characterization of outlet flow for different diesel nozzle geometries", 2005, No. 2005-01-2120, SAE Technical Paper, 10 pages.

Turski, et al., Engineering the residual stress state and microstructure of stainless steel with mechanical surface treatments, Article for Springer-Verlag, May 11, 2010, 8 pages.

Hattori, Shuji, et al., "Prediction method for cavitation erosion based on measurement of bubble collapse impact loads." Wear 269.7-8 (2010), published online Jun. 25, 2010: pp. 507-514.

Takakuwa, Osamu, et al., "Suppression of hydrogen-assisted fatigue crack growth in austenitic stainless steel by cavitation peening." International journal of hydrogen energy 37.6 (2012), published online Jan. 2, 2012: pp. 5268-5276.

Soyama, Hitoshi, "Effect of nozzle geometry on a standard cavitation erosion test using a cavitating jet." Wear 297.1-2 (2013), published online Nov. 15, 2012: pp. 895-902.

Patella, Regiane Fortes, et al., "Mass loss simulation in cavitation erosion: Fatigue criterion approach." Wear 300.1-2 (2013), published online Feb. 13, 2013: pp. 205-215.

Mitelea, Ion, et al. "Ultrasonic cavitation erosion of nodular cast iron with ferrite-pearlite microstructure." Ultrasonics Sonochemistry 23 (2015), published online Nov. 10, 2014: pp. 385-390.

Li, Deng, et al., "Effects of nozzle inner surface roughness on the cavitation erosion characteristics of high speed submerged jets." Experimental Thermal and Fluid Science 74 (2016), published online Jan. 28, 2016: pp. 444-452.

Sato, et al., Using Cavitation Peening to Improve the Fatigue Life of Titanium Alloy Ti-6Al-4V Manufactured by Electron Beam Melting, Article for Scientific Research Publishing, Apr. 20, 2016, 11 pages.

Deng, Li et al., "Experimental study on the effect of feeding pipe diameter on the cavitation erosion performance of self-resonating cavitating waterjet", Experimental Thermal and Fluid Science, Elsevier, Amsterdam, NL, vol. 82, Nov. 27, 2016, pp. 314-325.

Marcon, Andrea, Water Cavitation Peening for Aerospace Materials—A Dissertation Presented to the Academic Faculty at The Georgia Institute of Technology, Jan. 2017, 211 pages.

Tan, K.L., et al. Surface Modification of Additive Manufactured Components by Ultrasonic Cavitation Abrasive Finishing, Wear, 378-379, 2017, 90-95 pg, Singapore.

U.S. Patent and Trademark Office, Office action regarding U.S. Appl. No. 15/693,409, dated May 30, 2018, 11 pages.

U.S. Patent and Trademark Office, Office action regarding U.S. Appl. No. 15/693,417, dated May 30, 2018, 10 pages.

(56) References Cited

OTHER PUBLICATIONS

European Patent Office, Extended European Search Report in European Patent Application No. 18190086.1, dated Feb. 5, 2019, 7 pages.
European Patent Office, Extended European Search Report in European Patent Application No. 18189818.0, dated Feb. 6, 2019, 10 pages.
European Patent Office, Extended European Search Report in European Patent Application No. 18190518.3, dated Feb. 6, 2019, 12 pages.
European Patent Office, Examination Report regarding European Patent Application No. 18190086.1, dated Jul. 30, 2019, 4 pages.
European Patent Office, Examination Report regarding European Patent Application No. 18189818.0, dated Oct. 24, 2019, 4 pages.
Tan, K. L., et al., "Surface finishing on IN625 additively manufactured surfaces by combined ultrasonic cavitation and abrasion." Additive Manufacturing 31 (2020) 100938, published online Nov. 6, 2019, 22 pages.
U.S. Patent and Trademark Office, Non-Final Office Action regarding U.S. Appl. No. 15/693,401, dated Nov. 15, 2019, 20 pages.
Ma, Wei, et al., "Experimental Research on the Waterjet Oscillating Characteristics of Helmholtz Nozzle", Journal of Applied Science and Engineering, 2019, vol. 22, No. 1, pp. 83-92.
European Patent Office, Communication Pursuant to Article 94(3) EPC regarding European Patent Application No. 18190086.1, dated May 7, 2020, 4 pages.
Campo, Frank, et al. "SERDP & ESTCP Webinar Series: Reducing Hazardous Materials in Weapons Systems: Advances in Waterjet Applications and Cold Spray Technologies" video, retrieved from the internet on Jan. 6, 2021, from www.serdp-estcp.org/Tools-and-Training/Webinar-Series/09-10-2020, published Sep. 10, 2020, 2 pages.
European Patent Office, Examination Report regarding European Patent Application No. 18189818.0 dated Jan. 12, 2021, 5 pages.
The State Intellectual Property Office of P.R.C., First Office Action and Search Report regarding Chinese Patent Application No. 2018109918271, dated Mar. 30, 2021, 18 pages.
The State Intellectual Property Office of P.R.C., First Office Action and Search Report regarding Chinese Patent Application No. 2018109917851, dated Jun. 2, 2021, 17 pages.
European Patent Office, Examination Report regarding European Patent Application No. 18190518.3, dated Jun. 21, 2021, 6 pages.
European Patent Office, Extended European Search Report in European Patent Application No. 21178917.7, dated Nov. 8, 2021, 10 pages.
Korean Intellectual Property Office, Office Action regarding Korean Patent Application No. 10-2018-0102673, dated Nov. 14, 2022, 13 pages.
European Patent Office, Extended European Search Report regarding European Patent Application No. 23175272.6 dated Nov. 20, 2023, 11 pages.
Federal Service for Intellectual Property, Office Action and Search Report regarding Russian Patent Application No. 2018124439/05(038711) dated Oct. 14, 2021, 11 pages.
The State Intellectual Property Office of P.R.C., Second Office Action regarding Chinese Patent Application No. 2018109918271, dated Nov. 8, 2021, 20 pages.
Federal Service for Intellectual Property, Office Action of the Substantive Examination regarding Russian Patent Application No. 2018124458/05(038747) dated Nov. 11, 2021, 25 pages.
The State Intellectual Property Office of P.R.C., Second Office Action regarding Chinese Patent Application No. 2018109917851, dated Jan. 20, 2022, 17 pages.
Canadian Intellectual Property Office, Office Action regarding Canadian Patent Application No. 3,011,311 dated Mar. 29, 2022, 4 pages.

\* cited by examiner

DAMAGE TOLERANT CAVITATION NOZZLE

BACKGROUND

Cavitation Abrasive Surface Finishing (CASF) is a promising new method of mechanically cleaning, smoothing surface roughness, and peening. A cavitating jet is injected into a fluid using a specialized nozzle, and cavitation bubbles are formed in the fluid by a transition to gas phase resulting from an increase in flow velocity and internal energy. The bubbles then collapse as the flow velocity and surrounding pressure dissipates, producing micro-jets that can peen a surface and/or energize abrasive particles that remove material from the surface on impact. However, the energized abrasive particles may also impact the nozzle, quickly causing significant damage.

SUMMARY

The present disclosure provides systems, apparatus, and methods relating to damage tolerant nozzles for cavitation abrasive surface finishing. In some examples, a cavitation nozzle may include a plate, a hollow body, and a cap removably engaged with the hollow body and holding the plate against a distal end of the hollow body. The plate may have a central aperture and a distal surface, wherein the distal surface is bisected by a groove and the hollow body is configured to deliver high pressure fluid through the central aperture. The delivered high pressure fluid may be discharged as a cavitating jet.

In some examples, a cavitation nozzle may include a plate, a hollow body, and a cap removably engaged with the hollow body and holding the plate against a distal end of the hollow body. The plate may have a distal face and a central aperture defining a fluid flow axis. The hollow body may be configured to deliver high pressure fluid through the central aperture as a cavitating jet. The cap may have a slit bisecting a distal surface, exposing the central aperture of the plate.

In some examples, a cavitation system may include a tank containing a slurry of water and abrasive media, and a nozzle submerged in the slurry. The nozzle may include a plate, a hollow body, and a cap removably engaged with the hollow body and holding the plate against a distal end of the hollow body. The plate may have a central aperture and a distal surface, wherein the distal surface is bisected by a groove and the hollow body is configured to deliver high pressure fluid through the central aperture. The delivered high pressure fluid may be discharged into the slurry to form a cloud of cavitation bubbles and energized abrasive particles.

Features, functions, and advantages may be achieved independently in various examples of the present disclosure, or may be combined in yet other examples, further details of which can be seen with reference to the following description and drawings.

DETAILED DESCRIPTION

Various aspects and examples of a cavitation nozzle configured to tolerate abrasive impact damage, as well as related systems and methods, are described below and illustrated in the associated drawings. Unless otherwise specified, a nozzle in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A and B, each of which is labeled accordingly.

Overview

In general, a cavitation nozzle in accordance with the present teachings may include at least one damage tolerance feature. Damage tolerance features include damage resistant materials such as diamond, flow directing structures such as nozzle plate recesses and/or grooves, and flow separation reduction geometry such as angled surfaces. The nozzle may further include performance enhancing features such as an elongate aperture to produce a fan-shaped jet, a distal slit to entrain abrasive particles, and/or an aperture constriction and expansion for more uniform flow.

Figure 1:
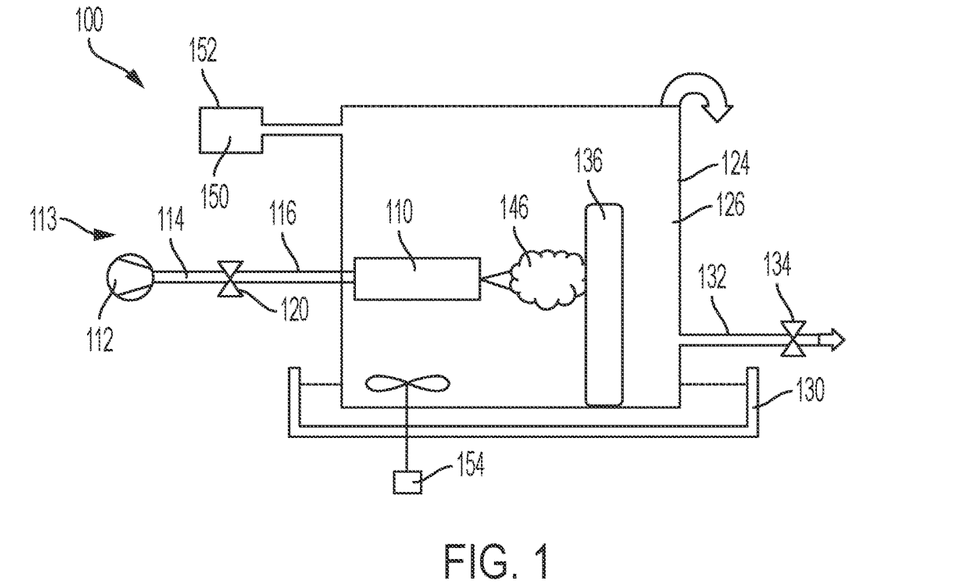
FIG. 1 is a schematic diagram of an illustrative cavitation abrasive surface finishing system including a damage tolerant nozzle in accordance with aspects of the present disclosure.

FIG. 1 is a schematic diagram of an illustrative cavitation abrasive surface finishing system 100, including a damage resistant cavitation nozzle 110. A supply reservoir system 113, including a high-pressure pump 112, supplies pressurized fluid 114 along a conduit 116. A control valve 120 may allow precise control of the pressure and flow rate of fluid supplied along conduit 116 to nozzle 110.

Nozzle 110 is submerged in a pressurized tank 124 filled with a slurry 126 of an abrasive particulate material mixed with a liquid. The slurry is allowed overflow from the tank into a catchment container 130. Abrasive slurry 126 also drains from tank 124 along a conduit 132, regulated by a control valve 134. In some examples, the slurry may drain into another tank where it can be processed to recover and reuse the abrasives in the slurry.

Nozzle 110 is directed toward a surface of a workpiece 136 in tank 124. Workpiece 136 may include any manufactured or repaired part requiring peening, cleaning, removal of surface material, and/or smoothing of surface roughness. For example, the workpiece may be an additively manufactured aluminum component with high surface roughness, or a titanium component with an alpha-case layer.

High pressure fluid 114 is injected through nozzle 110 into abrasive slurry 126 of tank 124 as a cavitating jet. An interaction between the cavitating jet and the abrasive slurry forms a vortex cloud 146 of cavitation bubbles and abrasive particles. As the bubbles of cloud 146 collapse, particles of the abrasive material may be excited and kinetically energized. The micro-jets created by collapsing bubbles may collectively accelerate the motion of the particles.

As the mixture of bubbles and particles contacts a surface of workpiece 136, the particles may impact the surface and remove material. That is, the abrasive particles may be acted on by the high forces of the cavitation cloud to smooth the surface of the workpiece. Normal cavitation peening may also occur, as the cavitation bubbles interact directly with the surface of workpiece 136. The surface may be thereby peened, improving residual stress and fatigue strength, and cleaned, ready for painting or use.

The cavitation bubbles may impart random directional motion to the abrasive particles, which may result in some impacts with nozzle 110. Nozzle 110 may be designed to resist damage from impacting abrasive particles and/or to alter flow dynamics to reduce the number of impacts, and thereby reduce damage to the nozzle during treatment of workpiece 136. For example, the nozzle may include a damage resistant material, may be shaped to reduce flow separation at the nozzle surface, may include features to produce eddies proximate the nozzle, and/or may be configured to improve entrainment of abrasive particles into the vortex of cloud 146.

The collapsing impact force of a cavitation bubble is determined in part by the pressure of injected fluid 114, the abrasive density of slurry 126 in tank 124, and the temperature of fluid 114 and slurry 126 of tank 124. To optimize these parameters, pressure, flow rate, or temperature sensors may be included in tank 124, and/or in conduits 116 or 132. High pressure fluid 114 may be between 50 and 22,000 pounds per square inch, or any effective pressure. A preferred pressure for fluid 114 may depend on the abrasive density of slurry 126 in tank 124, geometry of the treated surface of workpiece 136, and size of nozzle 110. Preferred pressure may also relate to design, geometry, materials or other properties of the cavitation nozzle.

To optimize these parameters, an abrasive density measuring device, and temperature sensor may be included in tank 124, or in any of conduits 116 or 132. Control valves 120, and 134, as well as reservoir supply system 113 and a temperature control system may be connected to an electronic controller or other such component to allow precise, coordinated control of pressure, flow, and temperature conditions throughout system 100.

In the pictured example, the cavitated fluid is water. However, any desired fluid may be used. Properties such as viscosity of the fluid used may affect the collapsing force of the cavitation bubbles and a fluid may be chosen to improve impact, or decrease the pressure required for a desired impact level. The fluid may also be selected according to properties of the abrasive material used, and/or to achieve desired properties of slurry 126. Any effective fluid flow device may be used to pump pressurized fluid through nozzle 110.

As high-pressure fluid 114 is injected by nozzle 110 into tank 124, the ratio of liquid to abrasive particles in slurry 126 may be affected. To maintain a desired ratio of slurry 126, abrasive material 150 may be added from a source 152. Source 152 may be regulated by an electronic controller configured to coordinate introduction of liquid, introduction of abrasive material, overflow of slurry 126, and outflow of the slurry through conduit 132.

In the present example, slurry 126 is preferably a ratio of approximately one third abrasive material and two thirds water by volume. An appropriate ratio may be selected according to the abrasive material, cavitation fluid used, and material of workpiece 136. The density, type, or concentration of abrasive material in the slurry may be selected to achieve a desired material removal rate (MRR).

Particles of abrasive material 150 may also tend to fall out of suspension in slurry 126 over time, under the action of gravity. To maintain suspension of slurry 126, a mixing device 154 is positioned in tank 124. In the present example, mixing device 154 is a mechanical agitator such as a rotating propeller, and is positioned at the bottom of tank 124. In general, any effective means of stirring, mixing, agitating or otherwise maintaining suspension of abrasive particles in slurry 126 may be used. For example, an ultrasonic agitator may be used, an agitator may be positioned at the top or side of tank 124, and/or a plurality of agitators may be positioned at multiple locations throughout the tank.

Abrasive material 150 may include particles of any effective material, of any grit size, or may include a mixture of materials. For example, the abrasive material may include metal, glass, ceramic, silica oxide, aluminum oxide, yttrium, garnet, pumice, nut shells, corn cob, and/or plastic particles. For another example, the abrasive material may include natural or synthetic rubber, silicon, fluoropolymer, elastomer, Viton, Teflon, and/or a Fullerene based carbon nanomaterial particles. All particles may preferably be within a range of approximately 16 to 1200 ANSI grit size.

EXAMPLES, COMPONENTS, AND ALTERNATIVES

The following sections describe selected aspects of exemplary damage tolerant nozzles for cavitation abrasive surface finishing as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Nozzle

As shown in FIGS. 2-14, this section describes an illustrative damage tolerant cavitation abrasive surface finishing nozzle 210. Nozzle 210 is an example of a cavitation nozzle and may be used in a cavitation abrasive surface finishing system as described above.

Figure 2:
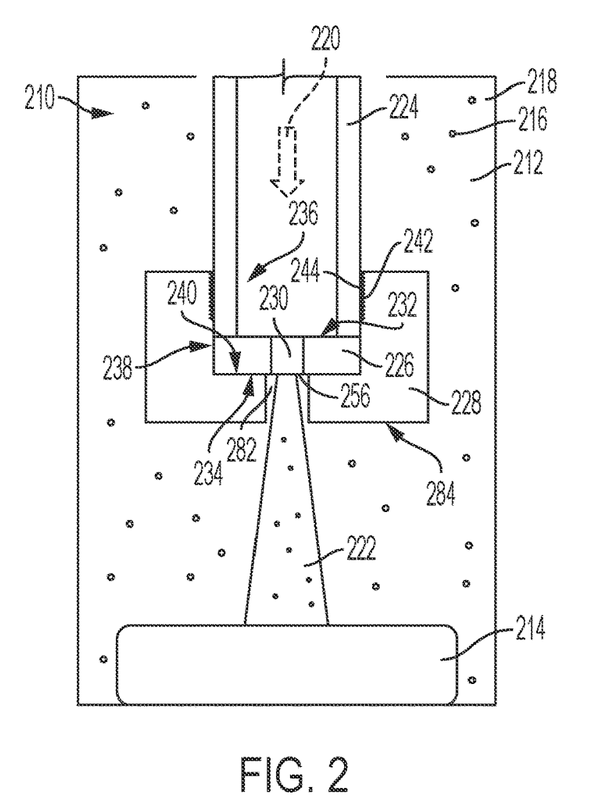
FIG. 2 is a schematic cross-sectional view of another illustrative damage tolerant nozzle submerged in a slurry.
Figure 4:
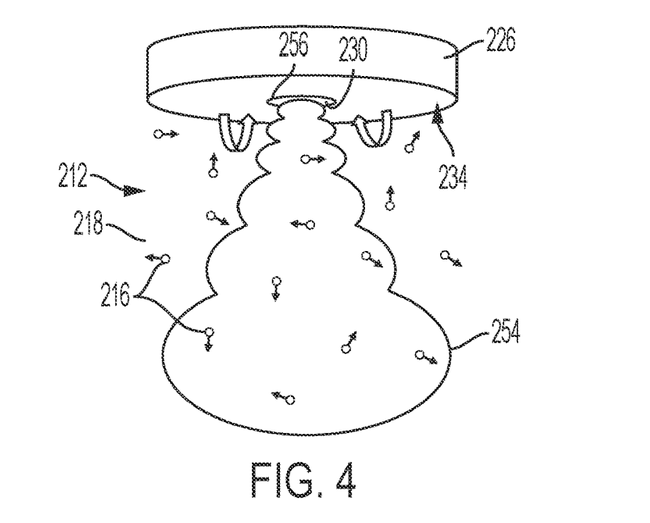
FIG. 4 is a schematic isometric view of another illustrative nozzle plate during cavitation abrasive surface finishing.
Figure 12:
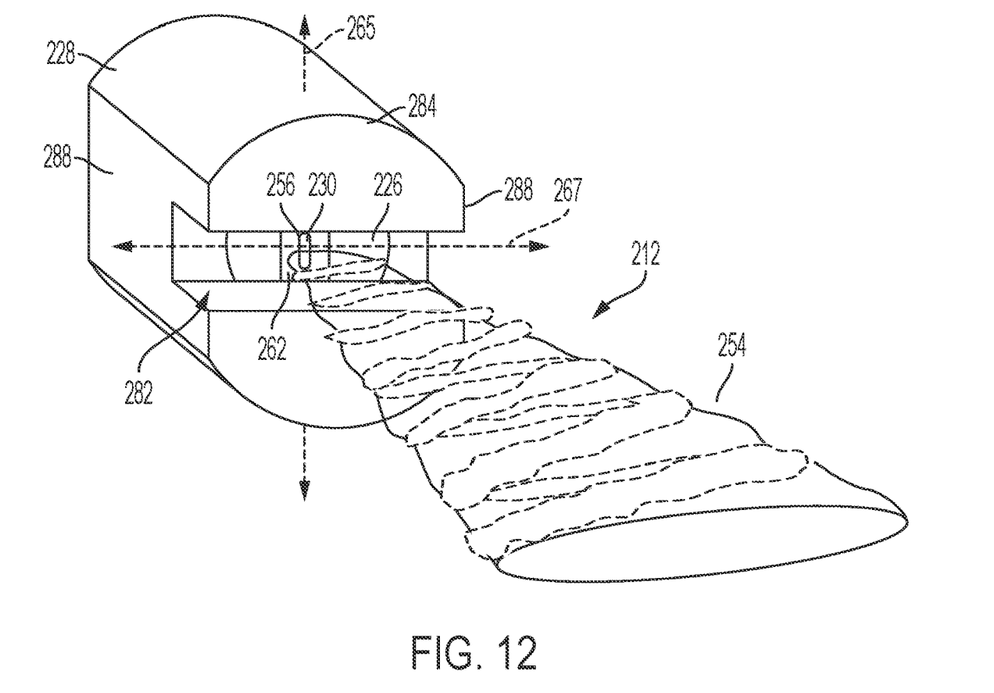
FIG. 12 is an isometric view of the nozzle plate and cap of FIG. 2, including a produced cavitation cloud vortex.

FIG. 2 is a schematic cross-section of nozzle 210 submerged in a slurry 212, to finish the surface of a workpiece 214. Slurry 212 includes a plurality of particles 216 of an abrasive material, suspended in water 218. High pressure water 220 is injected into slurry 212, through nozzle 210, as a cavitating jet plume 222. The cavitating jet interacts with slurry 212 to form a vortex cloud of cavitation bubbles, as depicted in FIGS. 4 and 12.

Nozzle 210 includes a hollow body 224, a nozzle plate 226, and a cap 228. High pressure water 220 is supplied to hollow body 224 by a pump or other system, and delivered by the hollow body to a central aperture 230 of nozzle plate 226. Hollow body 224 is generally cylindrical, and may further include interior structures appropriate to desired cavitation. For example, the hollow body may include one or more interior constrictions. In the present example, the hollow body has an interior diameter of at least approximately four times a diameter of central aperture 230, to achieve sufficient constriction to form cavitating jet plume 222.

Nozzle plate 226 is held against hollow body 224 by cap 228. The nozzle plate is approximately cylindrical, or disc-shaped, and includes a proximal face 232 and a distal face 234. The faces may also be described as a upstream side and a downstream side, relative to a direction of fluid flow. Central aperture 230 extends through the plate, from proximal face 232 to distal face 234. Proximal face 232 is secured against a distal end 236 of hollow body 224, forming a seal. In some examples, the nozzle may include a sealant or seal component between nozzle plate 226 and hollow body 224 and/or around central channel 238 of cap 228 to provide a seal appropriate to the pressure of high-pressure water 220.

Cap 228 includes a central channel 238 configured to receive nozzle plate 226 and distal end 236 of hollow body 224. The central channel includes an inner surface 240 complementary to distal face 234 of nozzle plate 226, and configured to bear against the distal face of the plate. In the example depicted in FIG. 2, inner surface 240 and distal face 234 are both planar. In some examples, distal face 234 and inner surface 240 may have complementary conicity, and/or interlocking protrusions and recesses.

In the present example, central channel 238 further includes a threaded surface 242 configured to engage a threaded portion 244 of an outer surface of distal end 236. As cap 228 is threaded onto distal end 236, the cap may advance along hollow body 224, thereby urging nozzle plate 226 against the distal end of the hollow body. In general, cap 228 and hollow body 224 may include any feature or features facilitating reversible attachment, such that the cap may be releasably secured to the hollow body to hold nozzle plate 226 in place.

In some examples, nozzle plate 226 and/or cap 228 may be permanently fixed to hollow body 224. For instance, an adhesive may be used to bond proximal face 232 of the nozzle plate to distal end 236 of the hollow body. In some examples, nozzle plate 226 may be releasably secured to distal end 236 directly, and cap 228 may be omitted from nozzle 210. For instance, the nozzle plate may include a threaded channel on proximal face 232, configured to engage threading on the distal end of the hollow body.

Releasably securing nozzle plate 226 to hollow body 224 with cap 228 may be preferable, to allow easy replacement of nozzle plate 226. The nozzle plate proximate central aperture 230 may be the portion of nozzle 210 to experience the greatest abrasive wear during cavitation, as discussed further with reference to FIG. 4, below. Including connection and/or sealing features such as threading on cap 228 instead of nozzle plate 226 may simplify design of the nozzle plate, and therefore reduce both cost to manufacture replacement nozzle plates and time required to replace the nozzle plates.

Figure 3:
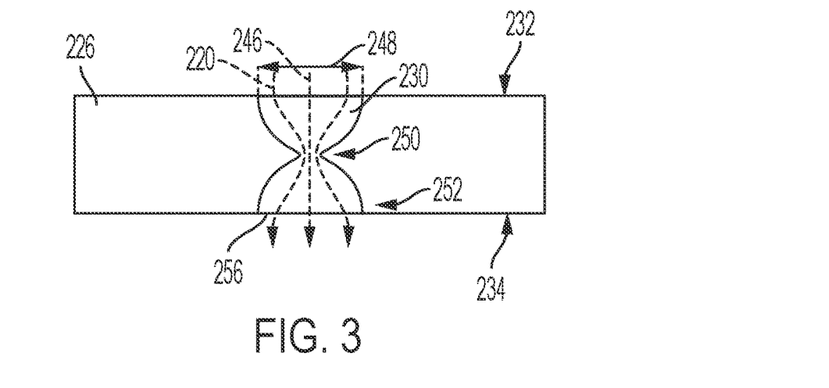
FIG. 3 is a schematic cross-sectional view of an illustrative uniform flow nozzle plate.
Figure 5:
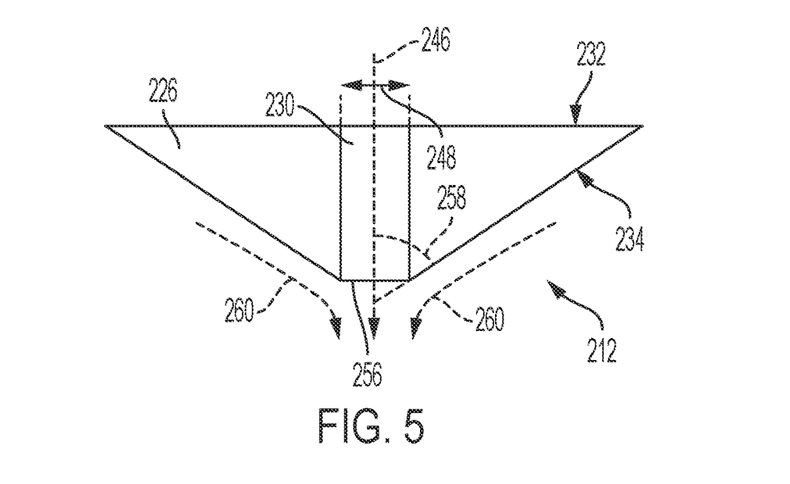
FIG. 5 is a schematic cross-sectional view of an illustrative frusticonical nozzle plate.

Central aperture 230 may be described as defining a fluid flow axis 246, as shown in FIGS. 3 and 5. High-pressure water 220 may flow in a direction generally parallel the fluid flow axis, along hollow body 224 and out through the central aperture. In the examples depicted in FIGS. 2 and 5, central aperture 230 is linear and has a constant diameter 248. In other words, the aperture has no constrictions or expansions. Central aperture 230 maintains a constant cross-sectional shape from proximal face 232 to distal face 234, as taken perpendicular to fluid flow axis 246. In some examples, central aperture 230 may be curved, constricted, and/or otherwise structured to produce a cavitating jet with desired properties.

In an example depicted in FIG. 3, central aperture 230 has an hour-glass shape. More specifically, the central aperture has a symmetrically curved constriction 250 and expansion 252. Diameter 248 of central aperture 230 decreases and then increases, along fluid flow axis 246, with a maximum value at proximal face 232 and distal face 234 and a minimal value halfway between the faces. Such constriction may homogenize fluid flow, resulting in a more uniform flow and a more even cavitating jet.

Central aperture 230 may be described as defining an opening in each of proximal face 232 and distal face 234. As shown in FIG. 4, opening 256 in distal face 234 may be exposed to slurry 212 and abrasive particles 216. FIG. 4 is a schematic depiction of nozzle plate 226 immersed in slurry 212 during cavitation, with the nozzle cap and body omitted for simplicity. The cavitating jet produced by the nozzle forms a vortex cloud of cavitation bubbles 254.

Abrasive particles 216 may cause damage to nozzle plate 226 by two mechanisms. Firstly, collapsing cavitation bubbles may impart random momentum to abrasive particles 216, such that some portion may be directed back to impact distal face 234 of nozzle plate 226. Secondly, slurry 212 may be drawn along distal face 234 by the action of the high-pressure cavitating jet and/or vortex of cloud 254, and particles 216 entrained into the vortex cloud proximate opening 256. Flow separation around the opening may cause some of the abrasive particles to impact distal face 234. As a result, the greatest abrasive damage to nozzle plate 226 may occur at or near opening 256.

Damage to distal face 234 may therefore be reduced or avoided by decreasing or eliminating the flow separation region surrounding opening 256. FIG. 5 depicts an example of nozzle plate 226 with a distal face 234 shaped to eliminate flow separation. In the depicted example, nozzle plate 226 is frustoconical. That is, distal face 234 forms an oblique angle 258 with fluid flow axis 246. Angle 258 may be selected according to calculated and/or modeled fluid dynamics in intended operating conditions such as temperature, working fluid, pressure, flow velocity, etc. The angle may be selected such that slurry 212 flows approximately as shown by arrows 260, along distal face 234 and into the vortex cloud without separating from the distal face.

Damage to distal face 234 of nozzle plate 226 may also be reduced by generating eddies in fluid flow at the distal face, to direct abrasive particles 216 away from the nozzle plate. FIGS. 6-9 depict four examples of nozzle plate features effective in generating such eddy currents. In each example, distal surface 234 of nozzle plate 226 is bisected by a linear groove 262. Central aperture 230 is disposed in groove 262, and the groove extends a full diameter of the nozzle plate, from edge to edge. The groove may be described as having a long axis 264. In the depicted examples, groove 262 has a semi-circular cross-sectional shape perpendicular to the long axis.

Figure 7:
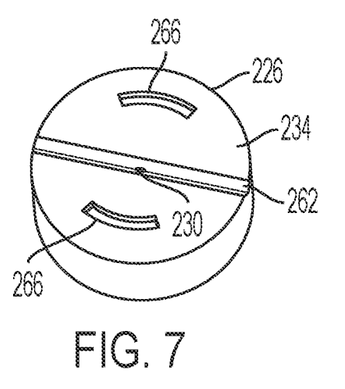
FIG. 7 is an isometric view of the nozzle plate of FIG. 6 with arcuate recesses.

In the example depicted in FIG. 7, nozzle plate 226 further includes a pair of arcuate recesses 266 in distal face 234. The arcuate recesses may also be referred to as grooves in the distal face. Arcuate recesses 266 are symmetrical, and symmetrically disposed on either side of groove 262. In the present example, each recess extends through approximately 60 degrees of arc, centered about central aperture 230.

Figure 8:
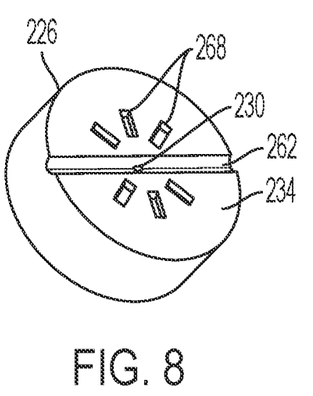
FIG. 8 is an isometric view of the nozzle plate of FIG. 6 with radial recesses.

In the example depicted in FIG. 8, nozzle plate 226 further includes a plurality of linear recesses 268. The linear recesses may also be referred to as grooves in the distal face. Each recess extends radially outward from central aperture 230, but is spaced from the central aperture and groove 262. The plurality includes six recesses, with three recesses on each side of groove 262. All six recesses are the same length, each approximately a quarter of a radius of distal face 234.

Figure 9:
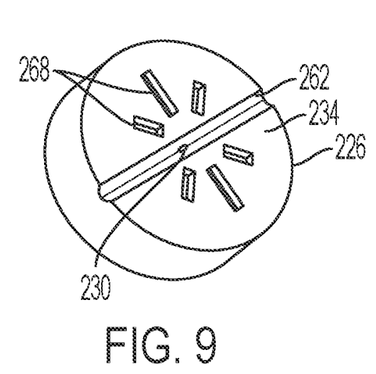
FIG. 9 is an isometric view of the nozzle plate of FIG. 6 with non-uniform radial recesses.
Figure 10:
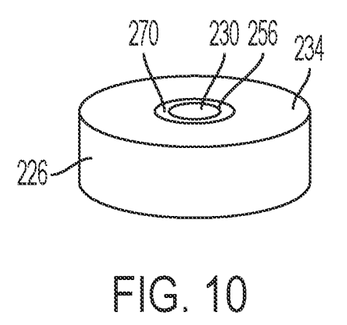
FIG. 10 is an isometric view of an illustrative nozzle plate with a diamond insert.

In the example depicted in FIG. 9, nozzle plate 226 similarly includes a plurality of linear recesses 268. Each recess extends radially outward from central aperture 230, but is spaced from the central aperture and groove 262. The plurality includes six recesses, with three recesses on each side of groove 262. A central one of each group of three recesses is longer than the two adjoining recesses. The central recesses are approximately one half of the radius of distal face 234, while the adjoining recesses are approximately one quarter of the radius.

Distal face 234 may include additional and/or alternative structures effective in generating desired eddies, currents, or other flow dynamics. For example, the distal face may include a spiral recess and/or may include one or more raised portions or protrusions. The depicted distal face configurations may be preferable for ease of manufacture and accordingly reduced cost. Particularly for hard, damage-resistant materials, simple linear and/or arcuate recesses may be easiest to manufacture while producing an effective fluid dynamic effect.

Some or all of nozzle plate 226 may be comprised of a damage-resistant material. In the example depicted in FIG. 10, the nozzle plate includes a reinforced portion 270. The reinforced portion surrounds and defines central aperture 230 and opening 256, thereby providing damage resistance at a region of distal face 234 most subject to abrasive particle impact and erosion. In the present instance, reinforced portion 270 is a cylindrical insert of single crystal grown diamond.

In some examples, such as those depicted in FIGS. 6-9, nozzle plate 226 is entirely comprised of a damage resistant material. In general any sufficiently hard and impact resistant material may be used. Examples include cubic boron nitride, boron carbon nitride, metal boride, and materials based on nanostructured fullerene. Single crystal diamond, including synthetically grown and naturally diamond, may be preferable for greatest damage resistance. Diamond or others of the above listed hard materials may also be useful for improving longevity of nozzle plates used in cavitation peening without abrasives.

In some examples, geometric design of nozzle plate 226 and/or a cap as described below, may alter flow dynamics sufficiently to reduce the level of hardness and impact resistance needed for the nozzle plate. In such examples, more common or inexpensive hard materials may have an acceptable lifespan. Examples include ceramics such as vanadium carbide and hard steels such as cold worked steel, oil hardened steel, air hardened steel, high speed steel, crucible steel, steel with a carbon content between approximately 0.5 percent (%) and 1.5%, and chromium-molybdenum steel (e.g. 4140 steel).

A material or combination of materials may be selected according to a desired balance of cost and longevity of nozzle plate 226. The materials chosen may be natural, synthetic, or combinations thereof. For example, a full diamond nozzle plate may be preferable for surface finishing of large parts or rough surfaces requiring long duration treatment, to avoid the need to replace the nozzle plate midway through treatment. Whereas, a nozzle plate of a less expensive material such as hardened steel and/or including only a diamond insert may be preferable where frequent nozzle plate replacement is acceptable, in order to reduce cost.

Figure 11:
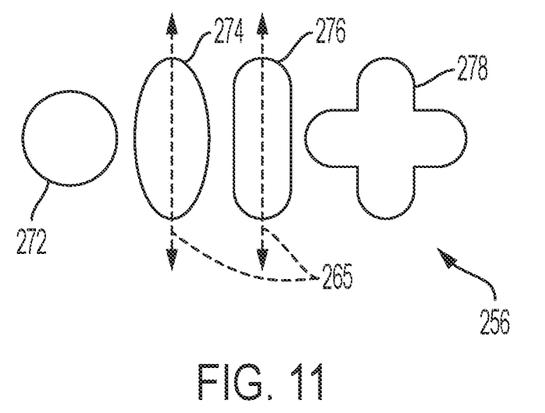
FIG. 11 is a schematic diagram of four illustrative opening shapes for a nozzle plate central aperture.

FIG. 11 depicts four examples of opening 256 of the central aperture of the nozzle plate, including a circular opening 272, an elliptical opening 274, a lozenge-shaped opening 276, and a lobular opening 278. Each shape may be only of opening 256, or may be a cross-sectional shape of the central aperture partially or entirely through the nozzle plate. An opening shape may be selected according to desired characteristics of the produced cavitation jet and resultant vortex cloud.

Circular opening 272 may produce a simple cylindrical, swirling jet. Each of elliptical opening 274 and lozenge opening 276 may be described as elongate, having a long axis 265. The elongate openings with groove 262 may each produce a complex, generally fan shaped jet, wider in a dimension perpendicular to the long axis of the opening. Such a fan jet is depicted in FIG. 12. A fan-shaped jet may allow treatment of a larger area, without reducing cavitation intensity. Lobular opening 278 may be also be described as clover-shaped, and may achieve a Gaussian shaped treatment aspect with dimly defined borders. Such a treatment area may facilitate overlapping passes with the nozzle, for improved overall coverage of a workpiece surface.

Illustrative features of a nozzle plate are depicted and described individually herein. In general, one or more damage reducing and/or performance improving features of a nozzle plate as described above may be used in any desired combination. For example, a nozzle plate may be comprised of diamond, include an hourglass-shaped central aperture with an elongate opening, and have a distal face at an oblique angle to the fluid flow axis defined by the central aperture, the distal face including a bisecting groove and a plurality of radial recesses.

Figure 6:
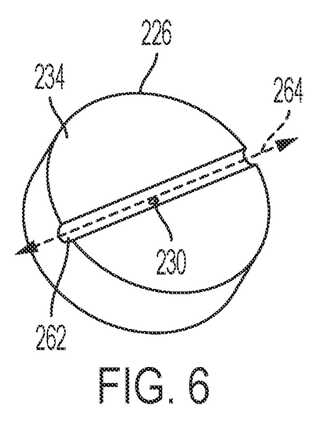
FIG. 6 is an isometric view of an illustrative grooved nozzle plate.

FIG. 12 is an isometric view of cap 228 and an example of nozzle plate 226 as depicted in FIG. 6, including bisecting groove 262 and with opening 256 of central aperture 230 having a lozenge-shape as depicted at 276 in FIG. 11. In the present example, long axis 265 of opening 256 is parallel the long axis of groove 262. In some examples, the long axes of the opening and the groove may be perpendicular, or may form an oblique angle.

In FIG. 12, cap 228 and nozzle plate 226 are depicted in operation, submerged in slurry 212 and producing vortex cloud 254. Due to the elongate shape of opening 256 with groove 262, nozzle plate 226 produces a fan jet and resulting vortex cloud 254 is also fan-shaped. The cloud may also be described as wider in a direction perpendicular to long axis 265 of opening 256. In FIG. 12, the long axis of the opening is vertically oriented, producing a horizontally fanned cloud. The fanned cloud may have an elliptical treatment aspect, allowing peening of a larger surface area without reduced cavitation intensity.

Vortex cloud 254 increases in vorticity with distance from opening 256. Proximate nozzle plate 226 the cloud may be described has having zero-order mode vorticity, or as having an elliptical ring shape. At further distances, the vorticity may transition to first-order mode and second-order mode or a helix and double helix shape, respectively. Vorticity of cloud 254 may be stronger parallel long axis 265 of opening 256.

Figure 13:
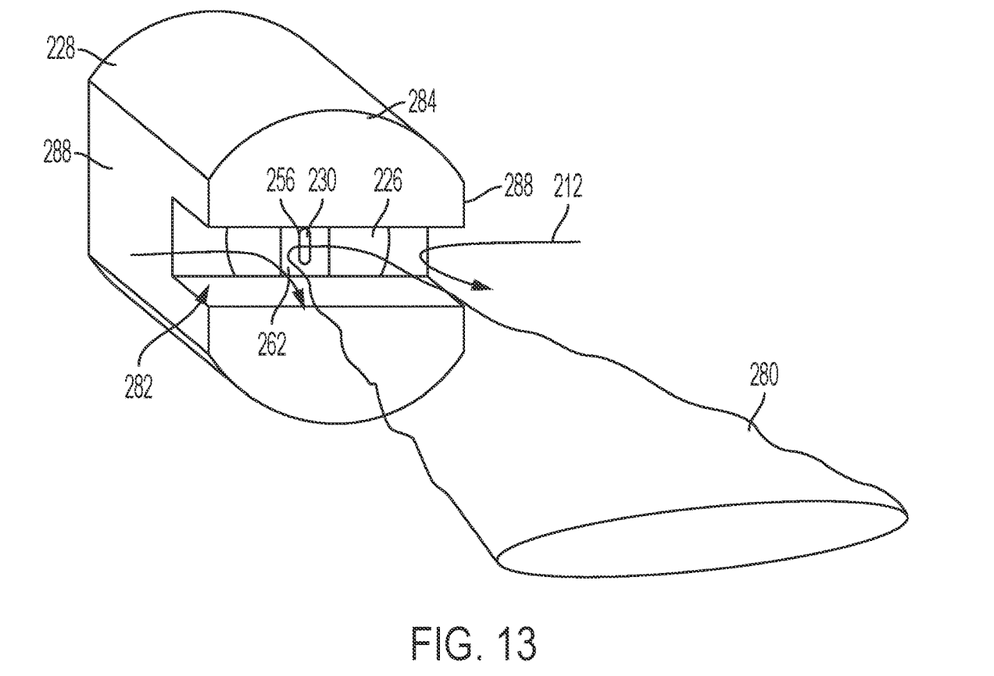
FIG. 13 is an isometric view of the nozzle plate and cap of FIG. 2, including a projected jet of entrained abrasive media.

Abrasive particles from slurry 212 may be entrained into cloud 254 by the vortex. As a result of the greater strength of the vortex along one axis, the abrasive slurry may fan out parallel to the vortex, as depicted in FIG. 13. In other words a projected jet of abrasive or an abrasive fan slurry 280 may form, which is wider in a direction perpendicular to long axis 265 of opening 256. As depicted, the kinetically excited abrasive particles fan out horizontally since the vortex cloud fans out horizontally.

Entrainment of abrasive particles from slurry 212 may also be assisted by a slit 282 in cap 228. The slit may be described as a linear recess or opening in a downstream or distal surface 284 of cap 228. As shown in FIG. 2, slit 282 is open to central channel 238 of the cap. As can be seen in FIGS. 12 and 13, the slit exposes central aperture 230 of nozzle plate 226, allowing passage of the cavitating jet through cap 228.

As shown in FIGS. 12 and 13, cap 228 is generally cylindrical, but includes first and second opposing flat faces 288. Slit 282 extends across distal surface 284 from one flat face 288 to the other, and forms an opening in each flat face. In the present example, slit 282 has a square cross-sectional shape and forms square openings in flat faces 288. In some examples, slit 282 may have a semi-circular shape and/or any shape effective in entraining abrasive particles.

Slit 282 bisects distal surface 284, and defines a long axis 267. In the present example, long axis 267 of slit 282 is perpendicular to long axis 265 of opening 256 and therefore is parallel the wider direction of abrasive fan 280. In some examples, the long axis of the slit may be parallel or form an oblique angle with the long axis of the opening. However, the long axes may preferably be perpendicular to achieve greatest entrainment.

Figure 14:
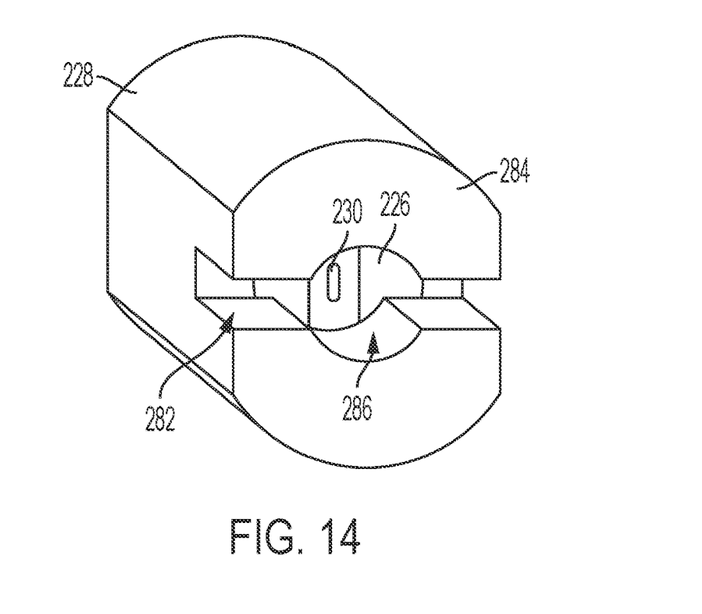
FIG. 14 is an isometric view of an illustrative wide angle cap.

FIG. 14 depicts another example of cap 228, further including a central bore 286. The central bore is approximately circular, centered relative to central aperture 230 of nozzle plate 226, and may be described as intersecting or being open to slit 282. Central bore 286 is open to the central channel of cap 228, but smaller in diameter than nozzle plate 226, such that the cap may still effectively secure the nozzle plate to the hollow body of the nozzle. Central bore 286 may enhance the vorticity of the produced cloud of cavitation bubbles, thereby increasing cavitation intensity.

In the present example, nozzle plate 226 and cap 228 are separate components, as shown in FIGS. 12-14. In some examples, the plate and cap may comprise a single component and/or comprise part of a larger unitary nozzle assembly. However, use of separate components may allow manufacture of nozzle plate 226 from an impact resistant material, while cap 228 is manufactured from a different material that is less expensive, lighter and/or easier to work. Additionally, use of separate components may allow replacement of only a small component where a majority of impact damage occurs, such as nozzle plate 226.

B. Illustrative Method

Figure 15:
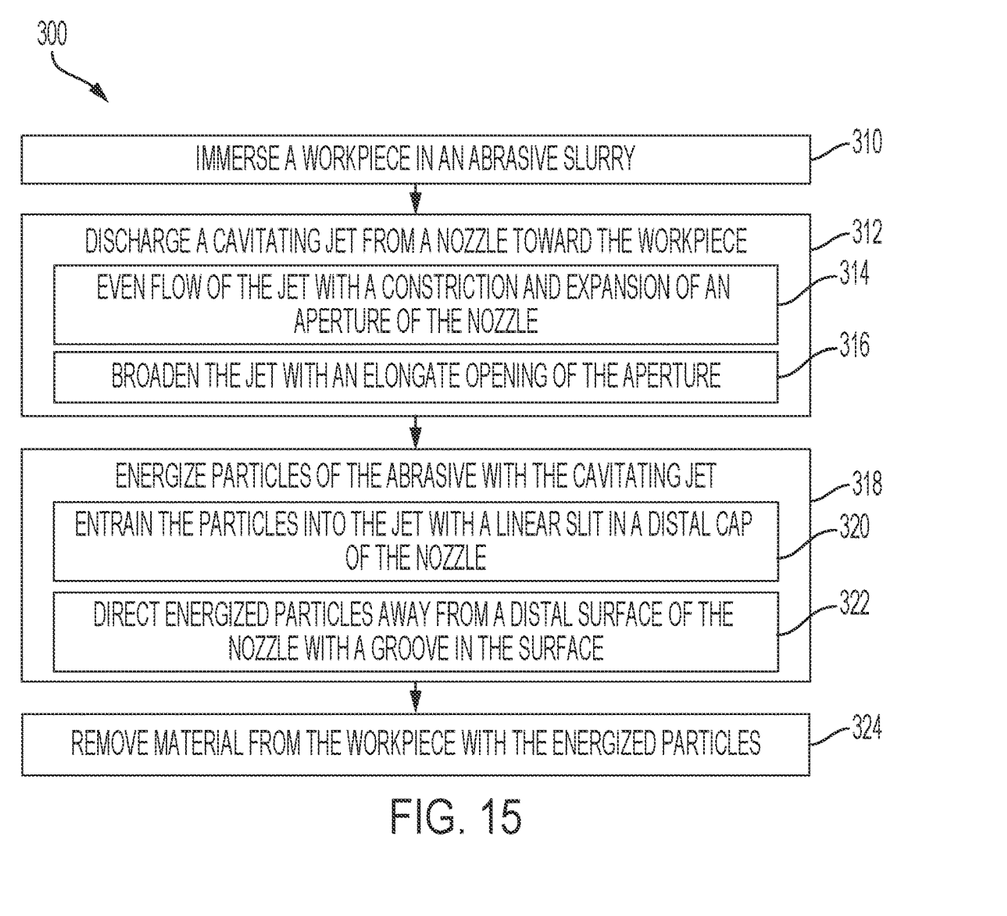
FIG. 15 is a flow chart depicting steps of an illustrative method for reducing nozzle damage during cavitation abrasive surface finishing, according to the present teachings.

This section describes steps of an illustrative method 300 for cavitation abrasive surface finishing; see FIG. 15. Aspects of nozzles and/or nozzle components described above may be utilized in the method steps described below. Where appropriate, reference may be made to components and systems that may be used in carrying out each step. These references are for illustration, and are not intended to limit the possible ways of carrying out any particular step of the method.

FIG. 15 is a flowchart illustrating steps performed in an illustrative method, and may not recite the complete process or all steps of the method. Although various steps of method 300 are described below and depicted in FIG. 15, the steps need not necessarily all be performed, and in some cases may be performed simultaneously or in a different order than the order shown.

At step 310, the method includes immersing a workpiece in an abrasive slurry. For example, the workpiece may be secured to a stage in a tank filled with the slurry, or secured to a rack and lowered into the tank. The workpiece may include any part or parts requiring abrasive surface finishing on one or more surfaces. The slurry may include particles of one or more abrasive media suspended in a liquid such as water. Selected slurry conditions such as particulate density, liquid temperature, and/or pressure may be maintained by an operator or control system.

Step 312 of the method includes discharging a cavitating jet from a nozzle toward the workpiece. High pressure fluid such as water may be supplied to the nozzle by a pump, at selected pressure, flow rate, and/or temperature. The nozzle may be immersed in the abrasive slurry at a selected standoff distance from a surface of the workpiece to be treated. The nozzle may be translated relative to the workpiece surface by an operator and/or a motorized maneuverable mechanism such as a Computer Numerical Control (CNC) articulated or robotic arm, in order to scan the jet over and thereby treat the workpiece surface.

Sub-step 314 of step 312 includes evening flow the discharged cavitating jet with a constriction and expansion of an aperture of the nozzle. The cavitating jet may be discharged through the aperture into the surrounding slurry, and flow dynamics of the jet may be altered by the internal geometry of the aperture. The constriction and expansion may be symmetrical, and described as an hour-glass shape. The constriction and expansion may prevent concentration of flow along a central axis of the jet, and increase flow at outer edges of the jet for more even treatment.

Sub-step 316 of step 312 includes broadening the jet with an elongate cross-section of the aperture. A downstream opening of the aperture may have an elongate shape such as an ellipse or a lozenge, resulting in a fan-shaped jet. The jet may be broader in a direction parallel to the elongation of the opening. Such broadening of the jet may increase a treatment surface area of the jet, thereby reducing overall treatment time for the workpiece.

At step 318, the method includes energizing particles of the abrasive with the cavitating jet. The cavitating jet may interact with the surrounding abrasive slurry to produce a vortex cloud of cavitation bubbles. Vortex action of the cloud may draw in and entrain abrasive particles from the surrounding slurry. Collapse of the cavitation bubbles may impart kinetic energy to the entrained abrasive particles.

Sub-step 320 includes entraining the particles into the jet with a linear slit in a distal cap of the nozzle. The slit may be open to and expose the aperture of the nozzle. In some examples, the cap may secure a nozzle plate or other component of the nozzle in place. The slit may be linear, and square in cross-section. The slit may extend perpendicular to a long axis of the elongate opening of the aperture, such that the slit is parallel to a wider dimension of a fan of entrained abrasive particles produced by asymmetrical vortex strength resulting from the broadened cavitating jet.

Sub-step 322 includes directing energized particles away from a distal surface of the nozzle with a groove in the surface. The surface may be of a nozzle plate, or other component of the nozzle including the aperture of the nozzle. The groove may be configured to generate an eddy current proximate the distal surface of the nozzle, and may have any effective shape and/or the distal surface may include a plurality of grooves. For example, the distal surface may be bisected by a linear groove, may include one or more arcuate grooves, and/or may include a plurality of radial groove sections.

Step 324 includes removing material from the workpiece with the energized particles. The particles may impact the workpiece surface with sufficient energy to remove material. Impact force and the amount of material removed may depend on cavitation intensity and therefore the amount of energy imparted to the particles, as well as the selected abrasive or abrasives. Collectively the energized particles may remove a layer of material from the workpiece. For example, the particles may remove a rough surface layer such as those produced by additive manufacturing processes or eliminate an alpha case layer such as that resulting from high temperature processing of titanium. The surface of the workpiece may be concurrently peened by the collapsing cavitation bubbles of the produced vortex cloud.

Illustrative Combinations and Additional Examples

This section describes additional aspects and features of damage tolerant nozzles and related systems and methods, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A cavitation nozzle, comprising:
a plate having a central aperture and a distal surface, wherein the distal surface is bisected by a groove,
a hollow body configured to deliver high pressure fluid through the central aperture, and
a cap removably engaged with the hollow body, holding the plate against a distal end of the hollow body,
wherein the high pressure fluid delivered to the central aperture is discharged as a cavitating jet.

A1. The nozzle of A0, wherein the distal surface of the plate includes a plurality of recesses.

A2. The nozzle of A1, wherein the plurality of recesses include a pair of arcuate recesses disposed on opposing sides of the bisecting groove.

A3. The nozzle of A1 or A2, wherein the plurality of recesses include radial linear sections, and are symmetric about the bisecting groove.

A4. The nozzle of any of A0-A3, wherein the distal surface has a frustoconic shape.

A5. The nozzle of any of A0-A4, wherein the plate comprises a diamond crystal material.

A6. The nozzle of A5, wherein the plate includes a diamond portion, the diamond portion immediately surrounding the central aperture.

A7. The nozzle of any of A0-A6, wherein the cap includes a central channel that receives the plate and the distal end of the hollow body.

A8. The nozzle of A7, wherein the cap includes a linear slit perpendicular to the central channel and in fluid communication with the central channel, such that the cavitating jet discharged from the central aperture of the plate is discharged through the slit.

A9. The nozzle of A8, wherein the slit is configured to entrain particles from a fluid environment into the discharged cavitating jet.

A10. The nozzle of A8 or A9, wherein the slit includes a circular opening concentric with the central channel.

A11. The nozzle of any of A0-A10, wherein the central aperture of the plate has an elongate cross-sectional shape perpendicular to a direction of fluid flow.

A12. The nozzle of A11, wherein the central aperture has a constant width perpendicular to the direction of fluid flow.

A13. The nozzle of any of A0-A12, wherein the central aperture of the plate includes a constriction and an expansion.

A14. The nozzle of A13, wherein the central aperture has an hour-glass cross-sectional shape, parallel a direction of fluid flow.

A15. The nozzle of any of A0-A14, wherein the plate comprises one or more of the following materials: cubic boron nitride, carbon nitride, boron carbon nitride, metal boride, and nanostructured fullerene.

A16. The nozzle of any of A0-A15, wherein the plate comprises one or more of the following materials: cold worked steel, oil hardened steel, air hardened steel, high speed steel, crucible steel, steel with a carbon content between approximately 0.5 and 1.5 percent, chromium-molybdenum steel, and vanadium carbide.

B0. A cavitation system, comprising:
a tank containing a slurry of water and abrasive media,
a nozzle submerged in the slurry, including:
a plate having a central aperture and a distal surface, wherein the distal surface is bisected by a groove,
a hollow body configured to deliver high pressure fluid through the central aperture, and
a cap removably engaged with the hollow body, holding the plate against a distal end of the hollow body,
wherein the high pressure fluid delivered to the central aperture is discharged into the slurry to form a cloud of cavitation bubbles and energized abrasive particles.

B1. The cavitation system of B0, wherein the nozzle is the nozzle of any of A0-A14.

C0. A cavitation nozzle, comprising:
a plate comprised of diamond crystal material, having a distal face and a central aperture defining a fluid flow axis, and
a hollow body configured to deliver high pressure fluid through the central aperture as a cavitating jet.

C1. The cavitation nozzle of C0, wherein the distal face of the plate has a first groove.

C2. The cavitation nozzle of C1, wherein the first groove bisects the distal face of the plate.

C3. The cavitation nozzle of C2, wherein the distal face has plural radial grooves.

C4. The cavitation nozzle of any of C1-C3, wherein the first groove intersects the fluid flow axis.

C5. The cavitation nozzle of any of C1-C4, wherein the first groove is linear.

C6. The cavitation nozzle of any of C1-05, wherein the first groove is curved.

C7. The cavitation nozzle of any of C0-C6, wherein the central aperture of the plate has an elongate cross-sectional shape perpendicular to the fluid flow axis.

C8. The cavitation nozzle of any of C0-C7, further including a cap removably engaged with the hollow body, holding the plate against a distal end of the hollow body C9. The cavitation nozzle of C8, wherein the cap has a distal surface downstream from the distal face of the plate.

C10. The cavitation nozzle of C9, wherein the distal surface of the cap is bisected by a slit having a long axis perpendicular to the fluid flow axis.

C11. The cavitation nozzle of C10, wherein the central aperture of the plate is elongate, having a long axis perpendicular to the long axis of the slit of the cap.

C12. The cavitation nozzle of any of C0-C11, wherein the distal face of the plate forms an angle of less than ninety degrees with the fluid flow axis.

D0. A cavitation nozzle, comprising:
a plate having a distal face and a central aperture defining a fluid flow axis,
a hollow body configured to deliver high pressure fluid through the central aperture as a cavitating jet, and
a cap removably engaged with the hollow body, holding the plate against a distal end of the hollow body, wherein the cap has a slit bisecting a distal surface, exposing the central aperture of the plate.

D1. The cavitation nozzle of D0, wherein the plate has a groove bisecting the distal face.

D2. The cavitation nozzle of D1, wherein the slit has a long axis, and the groove has a long axis perpendicular to the long axis of the slit, D3. The cavitation nozzle of D1 or D2, wherein the central aperture has an elongate cross-section.

D4. The cavitation nozzle of any of D1-D3, wherein the groove has a long axis, and the central aperture has a long axis parallel to the long axis of the groove.

D5. The cavitation nozzle of any of D0-D4, wherein the plate is comprised of diamond crystal material.

E0. A cavitation nozzle, comprising:
a plate having a distal face and a central aperture defining a fluid flow axis, the distal face forming an acute angle with the fluid flow axis,
a hollow body configured to deliver high pressure fluid through the central aperture as a cavitating jet, and
a cap removably engaged with the hollow body, holding the plate against a distal end of the hollow body.

E1. The cavitation nozzle of E0, wherein the plate is comprised of diamond crystal material.

E2. The cavitation nozzle of E0 or E1, wherein the plate has a groove bisecting the distal face.

E3. The cavitation nozzle of E2, wherein the central aperture has a long axis parallel to a long axis of the groove.

E4. The cavitation nozzle of any of E0-E3, wherein the plate is comprised of hardened steel.

E5. The cavitation nozzle of any of E0-E4, wherein the plate is comprised of fullerene.

E6. The cavitation nozzle of any of E0-E5, wherein the plate is comprised of a nano-structured material.

E7. The cavitation nozzle of any of E0-E6, wherein the plate is comprised of a nitride compound with at least one of boron and carbon.

F0. A method of cavitation abrasive surface finishing, comprising:
immersing a workpiece in a mixture of a liquid and an abrasive,
discharging a cavitating jet through a central aperture of a plate of a nozzle, toward a surface of the workpiece,
energizing particles of the abrasive with the cavitating jet,
directing the energized particles away from the plate of the nozzle with a groove in a distal face of the plate, and
removing material from the surface of the workpiece with the energized particles.

F1. The method of F0, further including evening flow of the cavitating jet with a constriction and an expansion of the central aperture.

F2. The method of F0 or F1, further including broadening the cavitating jet with an elongate cross-section of the central aperture.

F3. The method of any of F0-F2, further including entraining the particles of the abrasive into the cavitating jet with a linear slit in a cap securing the plate.

G0. A cavitation nozzle, comprising:
a plate having a distal face and a central aperture defining a fluid flow axis, and
a hollow body configured to deliver high pressure fluid through the central aperture as a cavitating jet,
wherein the plate comprises one or more of the following materials: cubic boron nitride, carbon nitride, boron carbon nitride, metal boride, nanostructured fullerene, cold worked steel, oil hardened steel, air hardened steel, high speed steel, crucible steel, steel with a carbon content between approximately 0.5 and 1.5 percent, chromium-molybdenum steel, and vanadium carbide.

Advantages, Features, and Benefits

The different examples of the nozzle described herein provide several advantages over known solutions for cavitation peening in an abrasive environment. For example, illustrative examples described herein allow simple replacement of a nozzle component most subject to abrasive damage.

Additionally, and among other benefits, illustrative examples described herein increase useful nozzle lifetime by use of a damage resistant material.

Additionally, and among other benefits, illustrative examples described herein decrease abrasive damage by forming eddies at a distal nozzle surface to direct away energized abrasive particles.

Additionally, and among other benefits, illustrative examples described herein decrease abrasive damage by reducing and/or eliminating flow separation regions.

Additionally, and among other benefits, illustrative examples described herein improve abrasive entrainment into the cavitating jet produced by the nozzle.

Additionally, and among other benefits, illustrative examples described herein decrease treatment times by increasing jet coverage and homogenizing flow.

Additionally, and among other benefits, illustrative examples described herein allow overlapping treatment by producing a Gaussian treatment aspect with a dimly defined boundary.

No known system or device can perform these functions, particularly while achieving high intensity cavitation peening. Thus, the illustrative examples described herein are particularly useful for cavitation abrasive surface finishing. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A cavitation nozzle, comprising:
a plate having a distal face and a central aperture defining a fluid flow axis;
a hollow body configured to deliver high pressure fluid through the central aperture as a cavitating jet; and
a cap removably engaged with the hollow body, holding the plate against a distal end of the hollow body, wherein the cap has a slit bisecting a distal surface, exposing the central aperture of the plate,
wherein
the plate has a groove bisecting the distal face, the slit has a long axis, and the groove has a long axis perpendicular to the long axis of the slit.

2. The cavitation nozzle of claim 1, wherein the central aperture has an hourglass-shaped cross-section along the fluid flow axis.

3. The cavitation nozzle of claim 1, wherein the distal face of the plate forms an oblique angle relative to the fluid flow axis.

4. A cavitation nozzle comprising:
a hollow body configured to deliver high-pressure fluid, the hollow body having a distal end;
a nozzle plate having a proximal face and a distal face, the proximal face secured against the distal end of the hollow body, the nozzle plate defining a central aperture extending between the proximal face and the distal face; and
a cap holding the nozzle plate against the distal end of the hollow body, wherein the cap has a slit bisecting a distal surface of the cap, wherein the nozzle plate has a groove bisecting the distal face of the nozzle plate, and wherein the groove has a long axis perpendicular to a long axis of the slit.

5. The cavitation nozzle of claim 4, wherein the central aperture has an hourglass-shaped cross-section along the fluid flow axis.

6. The cavitation nozzle of claim 4, wherein the distal face of the nozzle plate forms an oblique angle relative to the fluid flow.

7. The cavitation nozzle of claim 4, wherein the nozzle plate includes a reinforced insert surrounding the central aperture.

8. The cavitation nozzle of claim 4, wherein the nozzle plate is substantially planar.

9. The cavitation nozzle of claim 8, wherein the nozzle plate has a substantially uniform thickness between the proximal face and distal face.

10. The cavitation nozzle of claim 8, wherein the nozzle plate has substantially parallel proximal and distal faces.

11. The cavitation nozzle of claim 10, wherein the distal face of the nozzle plate includes a linear groove bisecting the distal face.

12. The cavitation nozzle of claim 11, wherein the linear groove extends completely across the nozzle plate, from one edge to an opposite edge.

13. The cavitation nozzle of claim 8, wherein the nozzle plate comprises a thickness dimension smaller than a radius of the nozzle plate.

14. The cavitation nozzle of claim 8, wherein proximate surface of the cap contacts the distal surface of the nozzle plate.

15. The cavitation nozzle of claim 4, wherein the nozzle plate comprises diamond crystal material.

16. The cavitation nozzle of claim 4, wherein the nozzle plate comprises cubic boron nitride, boron carbon nitride, metal boride, or nanostructured fullerene.

17. The cavitation nozzle of claim 4, wherein a cross-sectional area of the groove is curved.

18. A cavitation nozzle comprising:
a hollow body configured to deliver high-pressure fluid, the hollow body having a distal end;
a nozzle plate having a proximal face and a distal face, the proximal face secured against the distal end of the hollow body, the nozzle plate defining a central aperture extending between the proximal face and the distal face; and
a cap holding the nozzle plate against the distal end of the hollow body, wherein the cap has a slit bisecting a distal surface of the cap, wherein the central aperture has an elongate opening, and wherein the central aperture has a long axis perpendicular to a long axis of the slit.

19. The cavitation nozzle of claim 18, wherein the nozzle plate has a groove bisecting the distal face of the nozzle plate, and wherein the groove has a long axis perpendicular to a long axis of the slit.

20. The cavitation nozzle of claim 18, wherein the elongate opening of the central aperture has an hour-glass shape comprising a symmetrically curved constriction and expansion along its long axis.

* * * * *